(12) United States Patent
Tokizawa

(10) Patent No.: US 7,225,526 B2
(45) Date of Patent: Jun. 5, 2007

(54) METHOD OF PRODUCING WINDING OF DYNAMO-ELECTRIC MACHINE

(75) Inventor: Takashi Tokizawa, Nisshin (JP)

(73) Assignee: Denso Corporation, Kariya (JP)

( * ) Notice: Subject to any disclaimer, the term of this patent is extended or adjusted under 35 U.S.C. 154(b) by 395 days.

(21) Appl. No.: 10/791,866

(22) Filed: Mar. 4, 2004

(65) Prior Publication Data

US 2004/0172805 A1  Sep. 9, 2004

(30) Foreign Application Priority Data

Mar. 7, 2003 (JP) ............................. 2003-061056

(51) Int. Cl.
*H02K 5/00* (2006.01)

(52) U.S. Cl. ........................... 29/596; 29/598; 29/606; 29/732; 310/184

(58) Field of Classification Search .......... 29/596–598, 29/605–606; 310/184, 201, 206, 179, 254
See application file for complete search history.

(56) References Cited

U.S. PATENT DOCUMENTS

| 4,028,572 | A | * | 6/1977 | Baltisberger | ................ 310/201 |
| 6,388,358 | B1 | * | 5/2002 | Umeda et al. | .............. 310/201 |
| 6,501,206 | B2 | * | 12/2002 | Oohashi et al. | ............. 310/184 |
| 6,557,239 | B2 | | 5/2003 | Takahashi et al. | |
| 6,694,598 | B2 | | 2/2004 | Takahashi et al. | |
| 6,971,153 | B2 | * | 12/2005 | Tokizawa et al. | ............. 29/596 |
| 2004/0172805 | A1 | * | 9/2004 | Tokizawa | .................... 29/596 |

FOREIGN PATENT DOCUMENTS

| JP | A 2001-69731 | 3/2001 |
| JP | A 2001-112197 | 4/2001 |
| JP | A 2001-197709 | 7/2001 |
| JP | A 2003-009434 | 1/2003 |

* cited by examiner

*Primary Examiner*—Minh Trinh
(74) *Attorney, Agent, or Firm*—Oliff & Berridge, PLC (57) ABSTRACT

A method of producing a winding from electric conductors received in slots formed in a stator core has the steps of forming a first copying surface at an end of each slot on the end surface of the stator core so as to be curved along a bending direction of the electric conductors, a step of forming a second copying surface on each of bending members, inserting each bending member into an area between two slots adjacent to each other such that the second copying surface is curved along the bending direction of the electric conductors and a successively-curved shape is formed out of both the first copying surface and the second copying surface, and bending each electric conductor along the first copying surface and the second copying surface in the successively-curved shape.

8 Claims, 11 Drawing Sheets

METHOD OF PRODUCING WINDING OF DYNAMO-ELECTRIC MACHINE

BACKGROUND OF THE INVENTION

1. Field of the Invention

The present invention relates to a method of producing a winding of a dynamo-electric machine such as an on-vehicle alternating current generator or the like mounted on passenger's automobiles or auto trucks.

2. Description of Related Art

Recently, improvement of generating ability of an on-vehicle alternating current generator has been increasingly required with an increase of current consumers such as a safety control device and the like. To respond to this request of the improvement of the generating ability, a method of producing a winding of a dynamo-electric machine is known. In this method, high power is obtained by arranging regularly electric conductors formed in a U-shape to place the electric conductors at high density in slots of a stator (for example, pp. 3 to 5 and FIGS. 1 to 19 in Published Unexamined Japanese Patent Application Publication No. 2001-69731). In this winding producing method, electric conductors arranged along a circumferential direction of a stator core are protruded from an end surface of the stator core to form coil ends, a plurality of pin-shaped jigs adjacent to each other along the circumferential direction are respectively inserted into predetermined areas in a radial direction of the stator core so as to fix the protruded portions of the electric conductors, tops of the electric conductors are twisted in the circumferential direction while using the pin-shaped jigs formed in a circular shape in section along the circumferential direction as a supporting point, and the coil ends are reshaped.

In the dynamo-electric machine's winding producing method disclosed in the Patent Application Publication, because the electric conductors are twisted while using the pin-shaped jigs as the supporting points, damage to insulating coats of the electric conductors at bending portions of the electric conductors can be prevented. However, because the pin-shaped jigs are inserted into the areas apart from the end surface of the stator core, a problem occurs in that the coil ends become taller. Because the coil ends are taller, the winding is lengthened so as to increase the resistance of the winding, and the output power of the dynamo-electric machine is undesirably lowered.

SUMMARY OF THE INVENTION

An object of the present invention is to provide, with due consideration to the above-described problem, a dynamo-electric machine's winding producing method in which the height of a coil end is lowered while preventing damage to an insulating coat of an electric conductor.

The object is achieved by the provision of a dynamo-electric machine's winding producing method in which a plurality of electric conductors respectively having insulating coats on surfaces thereof are received in each of a plurality of slots formed in a stator core in a line along a circumferential direction of the stator core so as to form a plurality of coil ends of the electric conductors when portions of the electric conductors protruded from an end surface of the stator core are bent in the circumferential direction of the stator core, a first copying surface is formed in a slot opening forming cut of each slot arranged on the end surface of the stator core so as to be curved along a bending direction of the corresponding electric conductors, a second copying surface is formed on a bending member inserted into an area between two groups of coil ends of the electric conductors of the two slots adjacent to each other in the circumferential direction for each pair of slots adjacent to each other so as to be curved along the bending direction of the corresponding electric conductors, and each of the electric conductors is bent along a successively-curved shape formed out of both the corresponding first copying surface and the corresponding second copying surface.

Accordingly, the electric conductors can be bent at the slot opening forming cuts placed on the inside of the end surface of the stator core, and the coil ends of the electric conductors can be lowered in height. Further, a successively-curved surface is substantially formed out of both the corresponding first copying surface and the corresponding entire second copying surface, and the electric conductors are gently bent along the successively-curved surfaces. Accordingly, no excessive stress is applied on bent portions of the electric conductors, and damage to the insulating coats can be prevented. Here, when the first copying surface is apart from the second copying surface, the successively-curved surface denotes a surface formed by connecting the first and second copy surfaces through an extended surface of the second copying surface. Further, each electric conductor bent along the curved shape does not necessarily have a curved surface agreeing with the curved shape. For example, the electric conductor bent along the curved shape sometimes rises from the first or second copying surface due to the slack of the electric conductor, and the electric conductor having a curved surface different from the curved shape is formed.

It is preferred that each electric conductor is bent along the corresponding first copying surface and the corresponding second copying surface in a condition that the corresponding bending member is in contact with the end surface of the stator core.

Accordingly, the electric conductors can be bent while the bending members are placed at positions closest to the end surface of the stator core and are in contact with the end surface of the stator core, and the coil ends can be further lowered in height. Further, because one surface of each bending member is restrained by the end surface of the stator core, the bending member can be easily positioned.

It is also preferred that each first copying surface is a portion of a curved surface formed on the corresponding slot opening forming cut, each second copying surface is a curved surface formed on a surface of the corresponding bending member, and a curved surface of the successively-curved shape is larger than a combination of the corresponding first copying surface and the corresponding second copying surface.

Accordingly, because the electric conductors can be bent along the larger curved surfaces, damage to the insulating coats can be prevented, and durability of the dynamo-electric machine can be improved.

It is also preferred that each first copying surface is a portion of a curved surface or an entire curved surface formed on the corresponding slot opening forming cut, and each second copying surface is a curved surface formed on a surface of the corresponding bending member.

Accordingly, because the electric conductors can be bent along larger curved surfaces including the second copying surfaces, damage to the insulating coats can be further prevented, and durability of the dynamo-electric machine can be improved. Further, when the second copying surface of each bending member is set to a flat surface, the bending member can be easily worked, and production cost of the bending members can be lowered.

It is also preferred that each bending member is formed in a skewer shape.

The object is also achieved by the provision of a dynamo-electric machine's winding producing method in which a plurality of electric conductors respectively having insulating coats on surfaces thereof are received in each of a plurality of slots formed in a stator core in a line along a circumferential direction of the stator core so as to form a plurality of coil ends of the electric conductors when portions of the electric conductors protruded from an end surface of the stator core are bent in the circumferential direction of the stator core and to position and bond tops of the electric conductors together, a first copying surface is formed in a slot opening forming cut of each slot arranged on the end surface of the stator core so as to be curved along a bending direction of the corresponding electric conductors and so as to intersect with the end surface of the stator core, a second copying surface and a third copying surface are formed on a bending member inserted into an area between the two groups of coil ends of the electric conductors of the two slots adjacent to each other in the circumferential direction for each pair of slots adjacent to each other so as to make an extended surface of the second copying surface come in contact with an intersection point of the corresponding first copying surface and the end surface of the stator core and so as to place the third copying surface further away from the end surface of the stator core than the second copying surface, the electric conductors are bent along the first copying surfaces, the electric conductors come in contact with the second copying surfaces, the electric conductors are bent along the third copying surfaces, the electric conductors are returned to positions, at which the electric conductors extend along the second copying surfaces, due to spring back of the electric conductors, and the electric conductors are bonded together so as to produce a winding from the electric conductors.

Accordingly, because the corner of each slot intersecting with the end surface of the stator core can be formed into the slot opening forming cut, the first copying surface having a comparatively large radius of curvature can be formed in the slot opening forming cut. Further, by considering spring back of the bent electric conductors, the portions of the electric conductors protruded from the slots are excessively bent in the circumferential direction according to a method of rotating tops of the electric conductors held by a holder, and the tops of the electric conductors are released from the holder. In this case, the bent electric conductors can be returned to positions, at which the electric conductors extend along the second copying surfaces, due to the spring back of the electric conductors, and the tops of the electric conductors can be bonded together. Accordingly, the electric conductors having the spring back can be bent to a predetermined shape. Moreover, when the electric conductors are excessively bent to compensate for the spring back, the electric conductors are bent along the third copying surfaces. Accordingly, no electric conductors can come in contact with corners of the end surface of the stator core.

DETAILED DESCRIPTION OF THE PREFERRED EMBODIMENTS

A method of producing windings of a dynamo-electric machine according to an embodiment of the present invention will now be described in detail with reference to the accompanying drawings.

Figure 1:
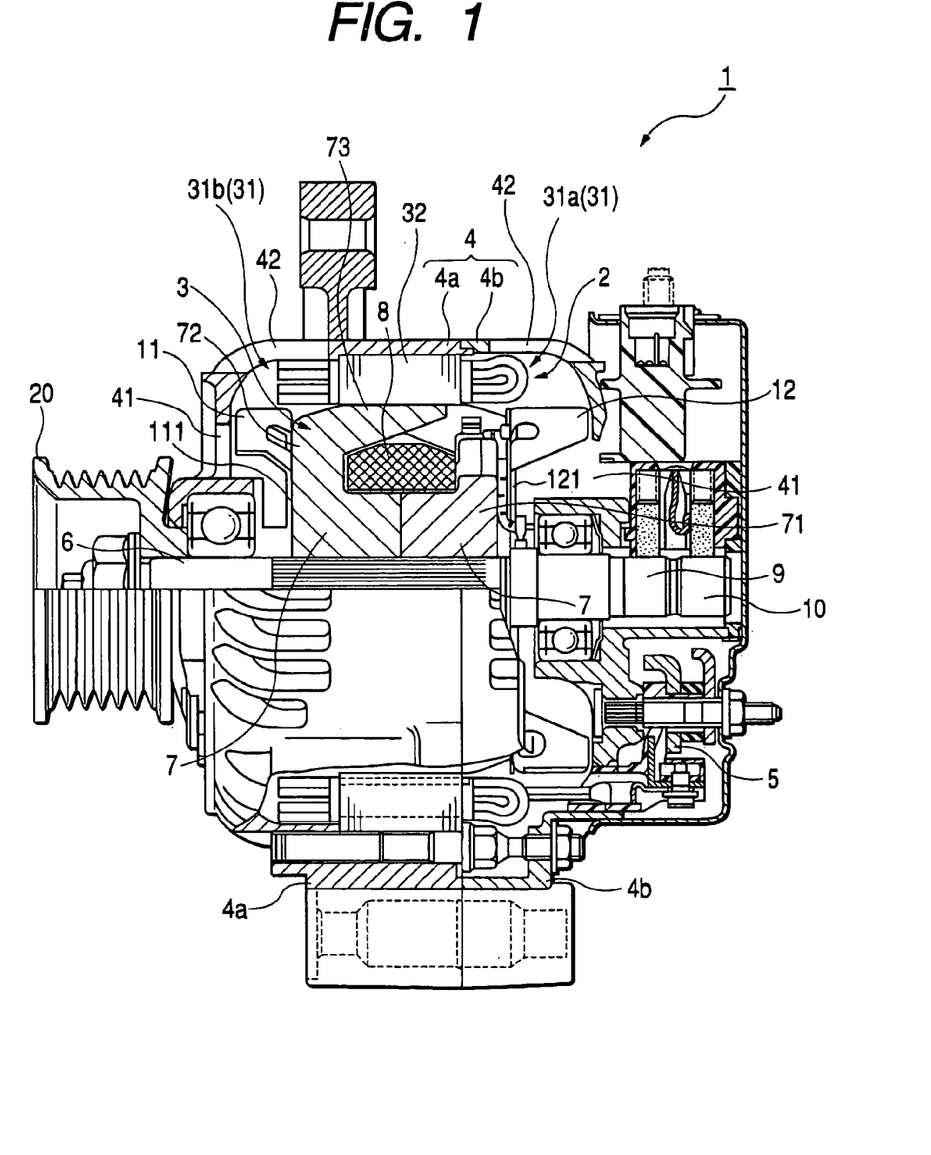
FIG. 1 is a sectional view showing the entire configuration of an on-vehicle alternating current generator according to an embodiment of the present invention.

FIG. 1 is a sectional view showing the entire configuration of an on-vehicle alternating current generator according to an embodiment of the present invention. As shown in FIG. 1, an on-vehicle alternating current generator 1 according to the embodiment comprises a stator 2, a rotator 3, a housing 4 and a rectifier 5.

The rotator 3 generates a magnetic field and is rotated with a shaft 6. The rotator 3 comprises a Lundell type pole core 7, a magnetic field coil 8, slip rings 9 and 10, a mixed flow fan 11 used as an air blower and a centrifugal fan 12. The shaft 6 is connected to a pulley 20 and is rotationally driven by a running engine (not shown) mounted on a vehicle.

The Lundell type pole core 7 is configured by combining a set of ball cores. The Lundell type pole core 7 comprises a boss 71 attached to the shaft 6, a disc 72 extending from both ends of the boss 71 in a radial direction of the pole core 7, and twelve nail-shaped magnetic poles 73.

The mixed flow fan 11 placed on the pulley side has a blade inclined at an acute angle to a base plate 111, which is tightly attached to an end surface of the pole core 7 by welding, and another blade inclined at right angles to the base plate 111. The mixed flow fan 11 rotates with the rotator 3. The centrifugal fan 12 placed on the opposite side to the pulley 20 has only a blade inclined at right angles to a base plate 121 which is tightly attached to the end surface of the pole core 7 by welding.

The housing 4 comprises a front housing 4a and a rear housing 4b. A supply opening 41 is arranged on an end surface of the housing 4 in its axial direction. Exhaust openings 42 for cooling wind are respectively arranged on both shoulders of the outer circumference of the housing 4.

One exhaust opening 42 is placed on the outside of a group of first coil ends 31a of the stator 2 in a radial direction of the housing 4, and the other exhaust opening 42 is placed on the outside of a group of second coil ends 31b of the stator 2 in the radial direction.

The rectifier 5 performs rectification by converting an alternating current voltage output from the stator 2 to a direct current voltage. The rectifier 5 is arranged on an end of the on-vehicle alternating current generator 1 placed on the opposite side to the pulley 20.

Figure 2:
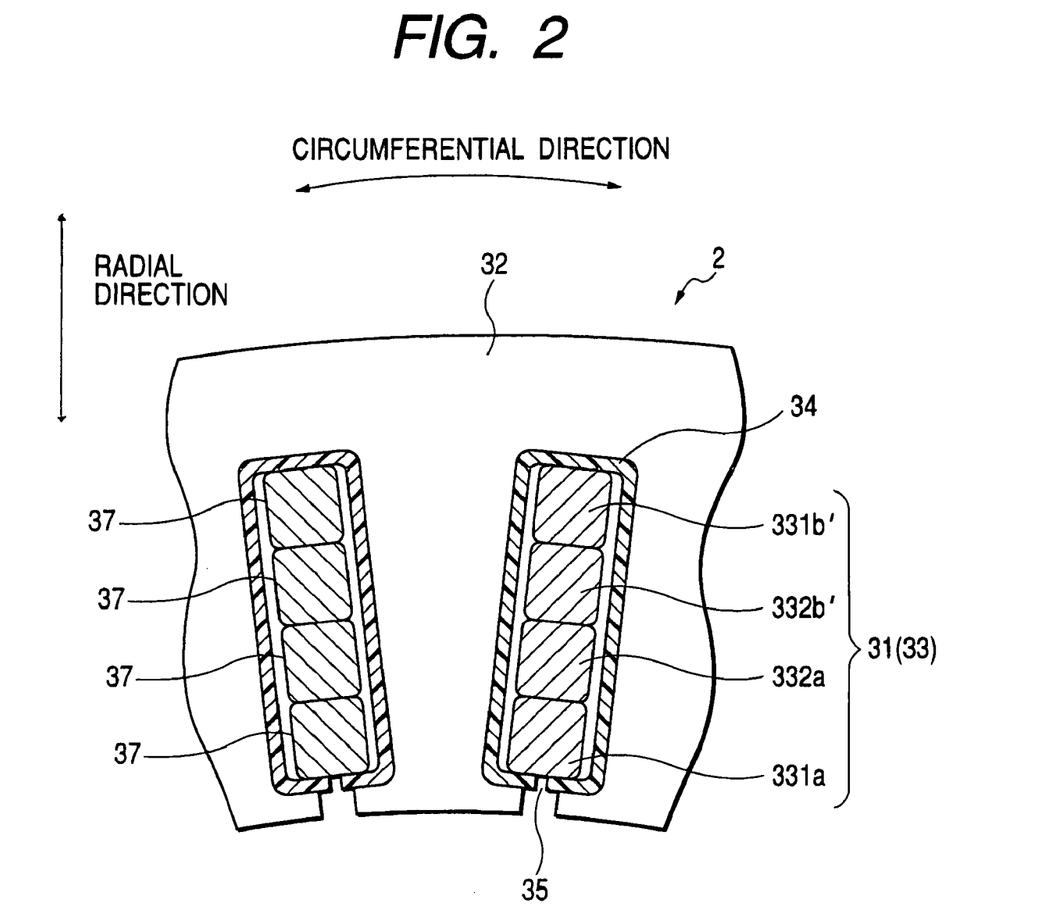
FIG. 2 is a partial sectional view of a stator.
Figure 3:
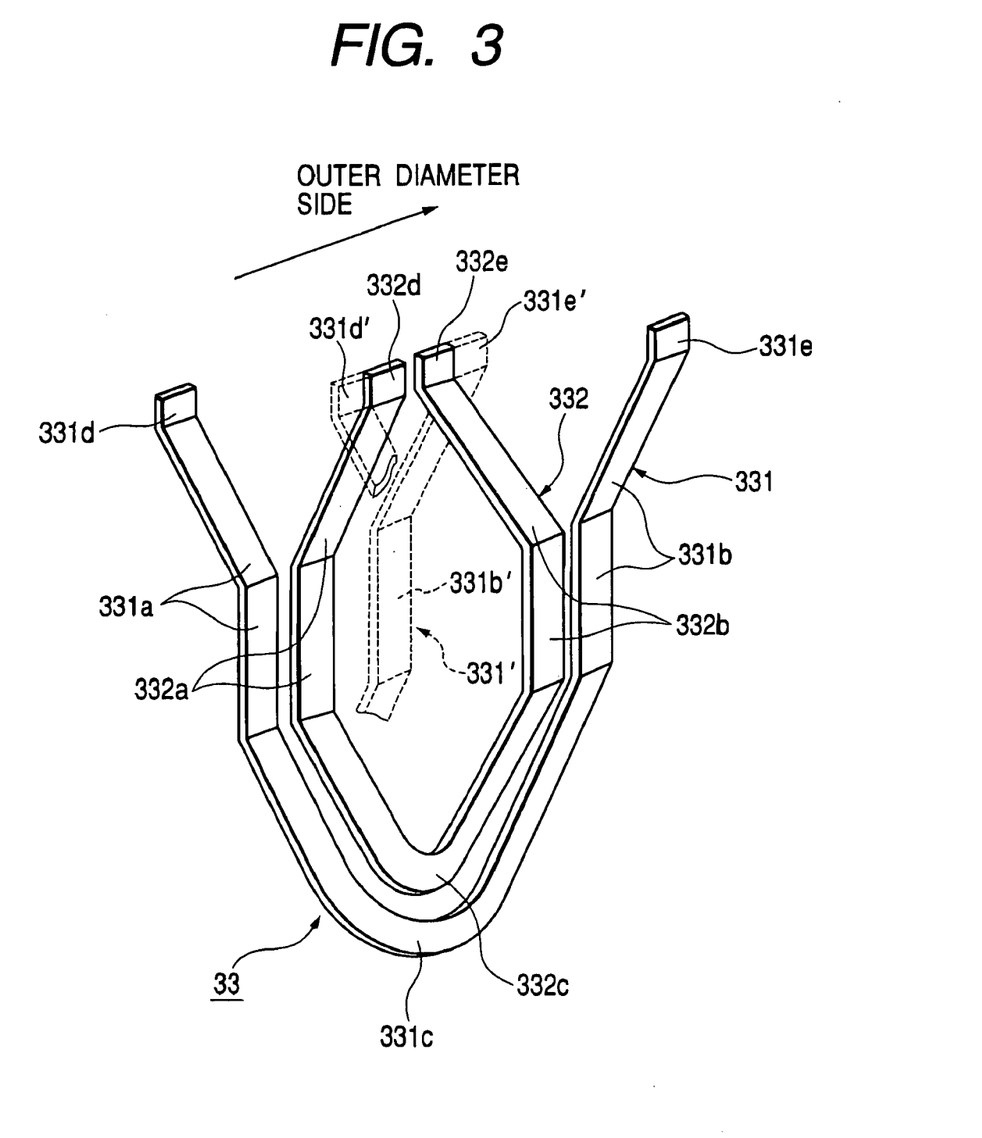
FIG. 3 is a perspective side view showing a modeling shape of a fundamental segment attached to a stator core.
Figure 4:
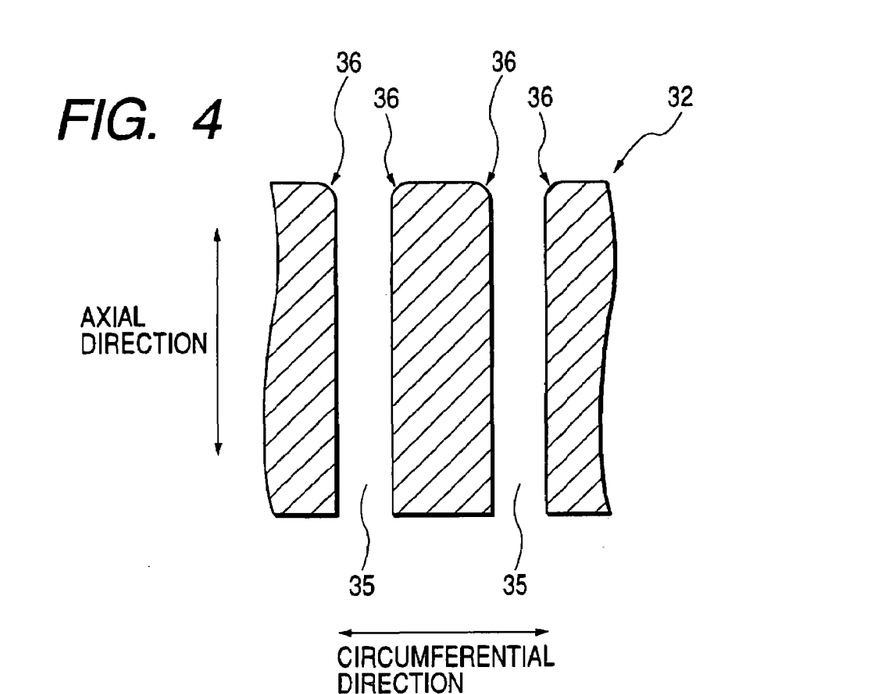
FIG. 4 is a partial sectional view along a circumferential direction of the stator core.

The stator 2 will be described in detail. FIG. 2 is a partial sectional view of the stator 2. FIG. 3 is a perspective side view showing a modeling shape of a segment 33 attached to a stator core 32. FIG. 4 is a partial sectional view along a circumferential direction of the stator core 32.

The stator 2 functions as an armature. The stator 2 comprises a stator core 32, a stator winding 31 arranged for each phase and configured by a plurality of segments 33, and a plurality of insulators 34 for electrically insulating the stator winding 31 from the stator core 32. Each segment 33 is composed of a plurality of electric conductors arranged in each of a plurality of slots 35 which are formed in the stator core 32.

As shown in FIG. 2, the slots 35 respectively having openings on the inner diameter side of the stator core 32 are formed in the stator core 32 so as to receive the electric conductors composing the stator windings 31 of multi phases. In this embodiment, thirty six slots 35 corresponding to the number of magnetic poles of the rotator 3 are arranged at equal intervals to receive the stator windings 31 of three phases. Therefore, twelve slots 35 selected from the thirty six slots 35 every three slots are used for one stator winding 31 for each phase.

As shown in FIG. 4, a plurality of slot opening forming cuts 36 of the slots 35 are formed in the neighborhood of one end surface of the stator core 32 in its axial direction, and the width of each slot 35 in the circumferential direction of the stator core 32 is gradually widened as a position in the slot 35 approaches the end surface of the stator core 32. The slot opening forming cut 36 of each slot 35 has a predetermined curved shape so as to form a copying surface (first copying surface) which is also called a profiling surface. When ends of the electric conductors inserted into the slots 35 are twisted, the ends of the electric conductors are curved along the copying surfaces. The slot opening forming cut 36 will be described later in detail.

Each stator winding 31 arranged in the slots 35 of the stator core 32 is formed out of the electric conductors inserted into the slots 35, and even-numbered electric conductors (in this embodiment, four electric conductors) are received in each slot 35. The four electric conductors in each slot 35 are arranged in a line in the radial direction of the stator core 32 and are respectively placed in an inner end layer, an inner intermediate layer, an outer intermediate layer and an outer end layer in the direction from the inside to the outside of the stator core 32. A coating material such as polyamideimide or the like is coated on each electric conductor to form an insulating coat 37 on the surface of the electric conductor.

The stator winding 31 is formed by connecting the electric conductors inserted into the slots 35 to each other in a predetermined pattern. In this embodiment, one end of each of the electric conductors of the slots 35 is connected to one end of the other electric conductor through a conductive continuing line on a first side of the stator core 32 in its axial direction, and the other end of each electric conductor is bonded to the other end of the other electric conductor on a second side of the stator core 32 in its axial direction. The first side of the stator core 32 agrees with the side of the first coil ends 31a shown in FIG. 1, and the second side of the stator core 32 agrees with the side of the second coil ends 31b shown in FIG. 1.

In detail, each electric conductor of each slot 35 is paired with one electric conductor of the other slot 35 apart from the slot 35 by a predetermined magnetic pole pitch. Particularly, to arrange each pair of electric conductors so as to be away from the other pair of electric conductors through a space on the first side of the stator core 32, the electric conductor of each layer in each slot 35 is paired with the electric conductor of the other layer in the other slot 35 apart from the slot 35 by the predetermined magnetic pole pitch.

For example, an electric conductor 331a of the inner end layer in each slot 35 is paired with an electric conductor 331b of the outer end layer in the other slot 35 apart from the slot 35 toward the clockwise direction by one magnetic pole pitch (in this embodiment, three times as long as an interval of two slots 35 adjacent to each other), and an electric conductor 332a of the inner intermediate layer in each slot 35 is paired with an electric conductor 332b of the outer intermediate layer in the other slot 35 apart from the slot 35 toward the clockwise direction by one magnetic pole pitch. As shown in FIG. 3, each of the electric conductors 331a and 332a is connected to the paired electric conductor portion 331b or 332b through a turn portion 331c or 332c denoting the continuing line on the first side of the stator core 32. Therefore, the continuing line connecting the electric conductor of the outer end layer and the electric conductor of the inner end layer surrounds the continuing line connecting the electric conductor of the outer intermediate layer and the electric conductor of the inner intermediate layer on the first side of the stator core 32. That is, the continuing line of paired electric conductors inserted into different slots is surrounded by the continuing line of other paired electric conductors inserted into the different slots on the first side of the stator core 32. Intermediate layer coil ends are formed by the continuing lines connecting the electric conductors of the outer intermediate layer and the electric conductors of the inner intermediate layer, and end layer coil ends are formed by the continuing lines connecting the electric conductors of the outer end layer and the electric conductors of the inner end layer.

The electric conductor 332a of the inner intermediate layer in each slot 35 is also paired with the electric conductor 331a' of the inner end layer in the other slot 35 apart from the slot 35 toward the clockwise direction by one magnetic pole pitch, and the electric conductor 331b' of the outer end layer in each slot 35 is also paired with the electric conductor 332b of the outer intermediate layer in the other slot 35 apart from the slot 35 toward the clockwise direction by one magnetic pole pitch. The electric conductors 332a and 331b' are respectively bonded to the other electric conductor portions 331a' and 332b on the second side of the stator core 32.

Therefore, a bond portion connecting the electric conductor 331b' of the outer end layer and the electric conductor 332b of the outer intermediate layer and a bond portion connecting the electric conductor portion 331a' of the inner end layer and the electric conductor portion 332a of the inner intermediate layer are arranged in a line in the radial direction of the stator core 32 on the second side of the stator core 32. Adjacent layer coil ends are formed by the bond portions connecting the electric conductors of the outer end layer and the electric conductors of the outer intermediate layer and the bond portions connecting the electric conductors of the inner end layer and the electric conductors of the inner intermediate layer.

In the actual work for preparing the electric conductors, a U-shaped segment is used for each pair of electric conductors paired on the first side of the stator core 32. The U-shaped segment is obtained by reshaping a base electric conductor having a cross section of an almost rectangular shape (straight angles in section) and a constant thickness in a predetermined shape. As shown in FIG. 3, a larger segment 331 is obtained by reshaping a larger base electric conductor in an almost U-shape and is used for one electric conductor of the inner end layer and one electric conductor of the outer end layer paired on the first side of the stator core 32. Further, a smaller segment 332 is obtained by reshaping a smaller base electric conductor in an almost U-shape and is used for one electric conductor of the inner intermediate layer and one electric conductor of the outer intermediate layer paired on the first side of the stator core 32.

Each larger segment 331 is formed in advance to have an electric conductor 331*a* not bent, a turn portion 331*c* corresponding to the continuing line and another electric conductor 331*b* not bent. Each smaller segment 331 is formed in advance to have an electric conductor 332*a* not bent, a turn portion 332*c* corresponding to the continuing line and another electric conductor 332*b* not bent.

One larger segment 331 and one smaller segment 332 inserted into the same two slots 35 forms a fundamental segment 33. A plurality of fundamental segments 33 are regularly arranged in the slots 35, and a coil going around the stator core 32 twice along its circumferential direction is formed by bonding the fundamental segments 33 together. However, segments for leader lines of the stator winding 31 and a turn portion connecting the coil of the first round and the coil of the second round are respectively embodied by differently-shaped segments having shapes different from that of the fundamental segment 33. In this embodiment, three differently-shaped segments are used for each phase. In the connection of the coil of the first round and the coil of the second round, the final electric conductor of one end layer in the first round is connected to the first electric conductor of one intermediate layer in the second round, and a differently-shaped coil end is formed by this connection.

A producing work of the stator winding 31 will be described below.

(Insertion work) Each fundamental segment 33 is figured so as to make the turn portion 331*c* of the U-shaped larger segment 331 surround the turn portion 332*c* of the U-shaped smaller segment 332, and the fundamental segment 33 is inserted from the first side of the stator core 32 into two slots 35 apart from each other by one magnetic pole pitch in the circumferential direction of the stator core 32 so as to protrude portions of the electric conductors 331*a*, 331*b*, 332*a* and 332*b* from the slots 35 toward the second side of the stator core 32. That is, one electric conductor 331*a* of one larger segment 331 is inserted into the inner end layer of one slot 35 of the stator core 32, and one electric conductor 332*a* of one smaller segment 332 is inserted into the inner intermediate layer of the slot 35. The other electric conductor 331*b* of the larger segment 331 is inserted into the outer end layer of the other slot 35 apart from the slot 35 in the clockwise direction by one magnetic pole pitch, and the other electric conductor portion 332*b* of the smaller segment 332 is inserted into the outer intermediate layer of the other slot 35. This insertion is performed for all slots 35.

As a result, as shown in FIG. 2, the electric conductors 331*a*, 332*a*, 332*b'* and 331*b'* are arranged in a line in that order from the inner end layer to the outer end layer in each slot 35. Here, the larger and smaller segments 331 and 332 of the electric conductors 331*a* and 332*a* differ from those of the electric conductors 332*b'* and 331*b'*, and the electric conductors 332*b'* and 331*b'* are respectively paired with one electric conductor of the inner end layer and one electric conductor of the inner intermediate layer of the other slot 35 apart from the slot 35 by one predetermined magnetic pole pitch.

(Bending work) After the insertion of the fundamental segments 33, the portions of the electric conductors 331*a* and 331*b* of each larger segment 331 protruded from the inner and outer end layers of the slots 35 are twisted and bent in the circumferential direction by 0.5 magnetic pole pitch (in this embodiment, 1.5 times as long as an interval of slots 35) on the second side of the stator core 32 so as to increase an open angle of the larger segment 331, and the portions of the electric conductors 332*a* and 332*b* of each smaller segment 332 protruded from the inner and outer intermediate layers of the slots 35 are twisted and bent in the circumferential direction by 0.5 magnetic pole pitch on the second side of the stator core 32 so as to decrease an open angle of the smaller segment 332. This bending work is performed for the fundamental segments 33 of all the slots 35.

As a result, the electric conductors adjacent to each other in the radial direction of the stator core 32 are inclined opposite to each other in the circumferential direction of the stator core 32 on the second side of the stator core 32. In other words, the electric conductor of the outer end layer of each slot 35 and the electric conductor of the outer intermediate layer of the other slot 35 apart from the slot 35 by one magnetic pole pitch are inclined so as to be positioned close to each other, and the electric conductor of the inner intermediate layer of each slot 35 and the electric conductor of the inner end layer of the other slot 35 apart from the slot 35 by one magnetic pole pitch are inclined so as to be positioned close to each other.

Further, a bonding portion 331*d* (or 331*d'*) and a bonding portion 331*e* (or 331*e'*) extended in the same direction as that of the electric conductors 331*a* and 331*b* inserted into the slots 35 are formed in end portions of each larger segment 331 (or 331'), and a bonding portion 332*d* and a bonding portion 332*e* extended in the same direction as that of the electric conductors 332*a* and 332*b* inserted into the slots 35 are formed in end portions of each smaller segment 332.

Moreover, the bonding portion 331*e'* of the outer end layer of each slot 35 and the bonding portion 332*e* of the outer intermediate layer of the other slot 35 apart from the slot 35 by one magnetic pole pitch are placed close to each other for each pair of slots 35, and the bonding portion 332*d* of the inner intermediate layer of each slot 35 and the bonding portion 331*d'* of the inner end layer of the other slot 35 apart from the slot 35 by one magnetic pole pitch are placed close to each other for each pair of slots 35.

Therefore, the second coil ends 31*b* composed of the bent portions of the electric conductors and the bonding portions are formed on the second side of the stator core 32.

Figure 5:
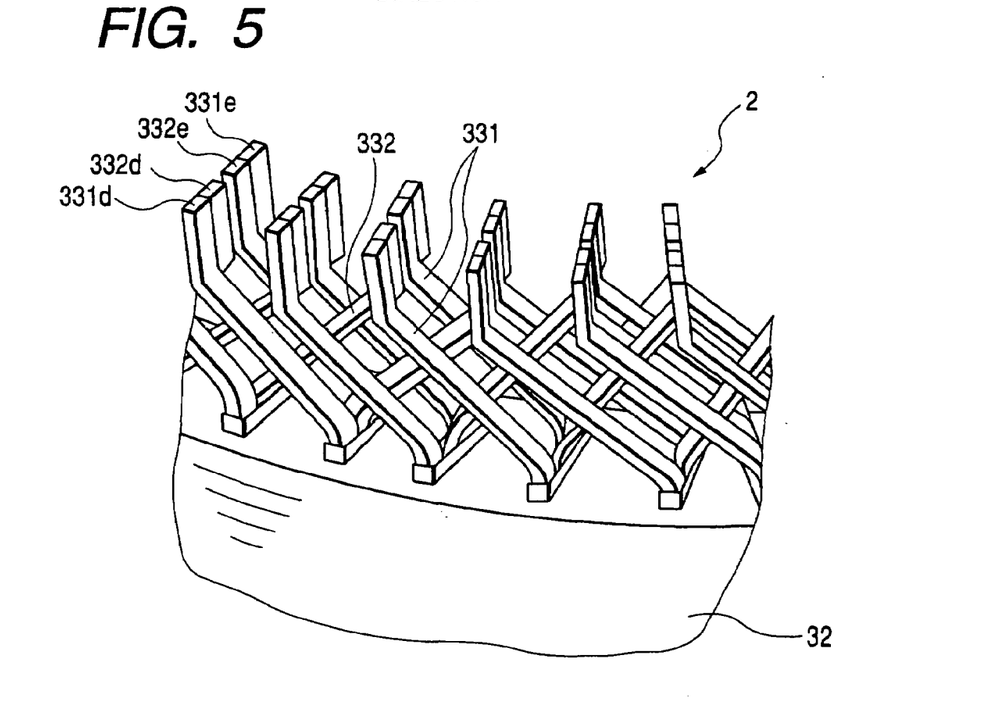
FIG. 5 is a partial sectional view of a stator wiring.

(Bonding work) The bonding portion 331*e'* of the outer end layer of each slot 35 and the bonding portion 332*e* of the outer intermediate layer of the other slot 35 apart from the slot 35 by one magnetic pole pitch are bonded together on the second side of the stator core 32 by welding, ultrasonic welding, arc welding, brazing or the like so as to electrically connect the bonding portions 331*e'* and 332*e*, and the bonding portion 332*d* of the inner intermediate layer of each slot 35 and the bonding portion 331*d'* of the inner end layer of the other slot 35 apart from the slot 35 by one magnetic pole pitch are bonded together on the second side of the stator core 32 in the same manner so as to electrically connect the bonding portions 332$d$ and 331$d'$. This bonding work is performed for the bonding portions of the fundamental segments 33 of all the slots 35. Therefore, the stator 2 having the coil ends shown in FIG. 5 can be obtained.

Next, the bending work described above will be described in more detail.

Figure 6:
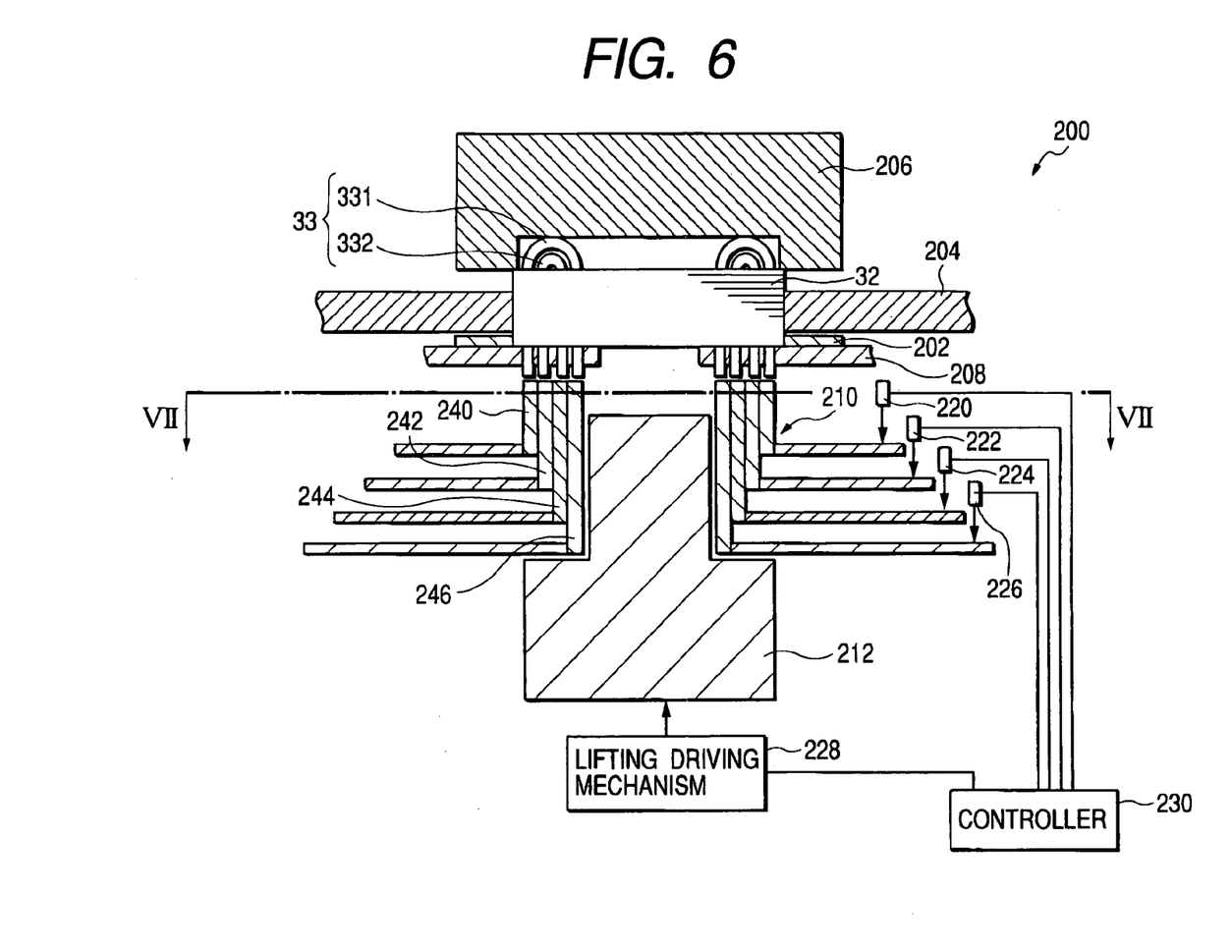
FIG. 6 is a sectional view of a twisting apparatus for twisting ends of segments in a bending work.

FIG. 6 is a sectional view of a twisting apparatus for twisting ends of the fundamental segments 33 in the bending work. As shown in FIG. 6, a twisting apparatus 200 according to this embodiment comprises a work receiver 202, a clamper 204, a work pressing member 206, a plurality of bending members 208, a twist reshaping unit 210, a lifting shaft 212, rotational driving mechanisms 220, 222, 224 and 226, a lifting driving mechanism 228 and a controller 230.

The work receiver 202 receives the periphery of the stator core 32 and fixes the stator core 32.

The clamper 204 holds the stator core 32 while restraining the stator core 32 from being moved in its radial direction. The work pressing member 206 prevents the stator core 32 from being lifted. The bending members 208 are inserted into areas placed in the neighborhood of root portions of the segments 33 protruded from the stator core 32 and reshape the root portions of the segments 33 to a predetermined shape when the segments 33 are twisted to bend the root portions of the segments 33.

The twist reshaping unit 210 twists straight portions of the segments 33 protruded from one end of the stator core 32. The lifting shaft 212 drives the twist reshaping unit 210 in the axial direction of the stator core 32.

The rotational driving mechanisms 220, 222, 224 and 226 rotationally drive the twist reshaping unit 210 in the circumferential direction of the stator core 32. The lifting driving mechanism 228 moves the lifting shaft 212 in the axial direction of the stator core 32. The controller 230 controls the rotational driving mechanisms 220, 222, 224 and 226 and the lifting driving mechanism 228.

Figure 7:
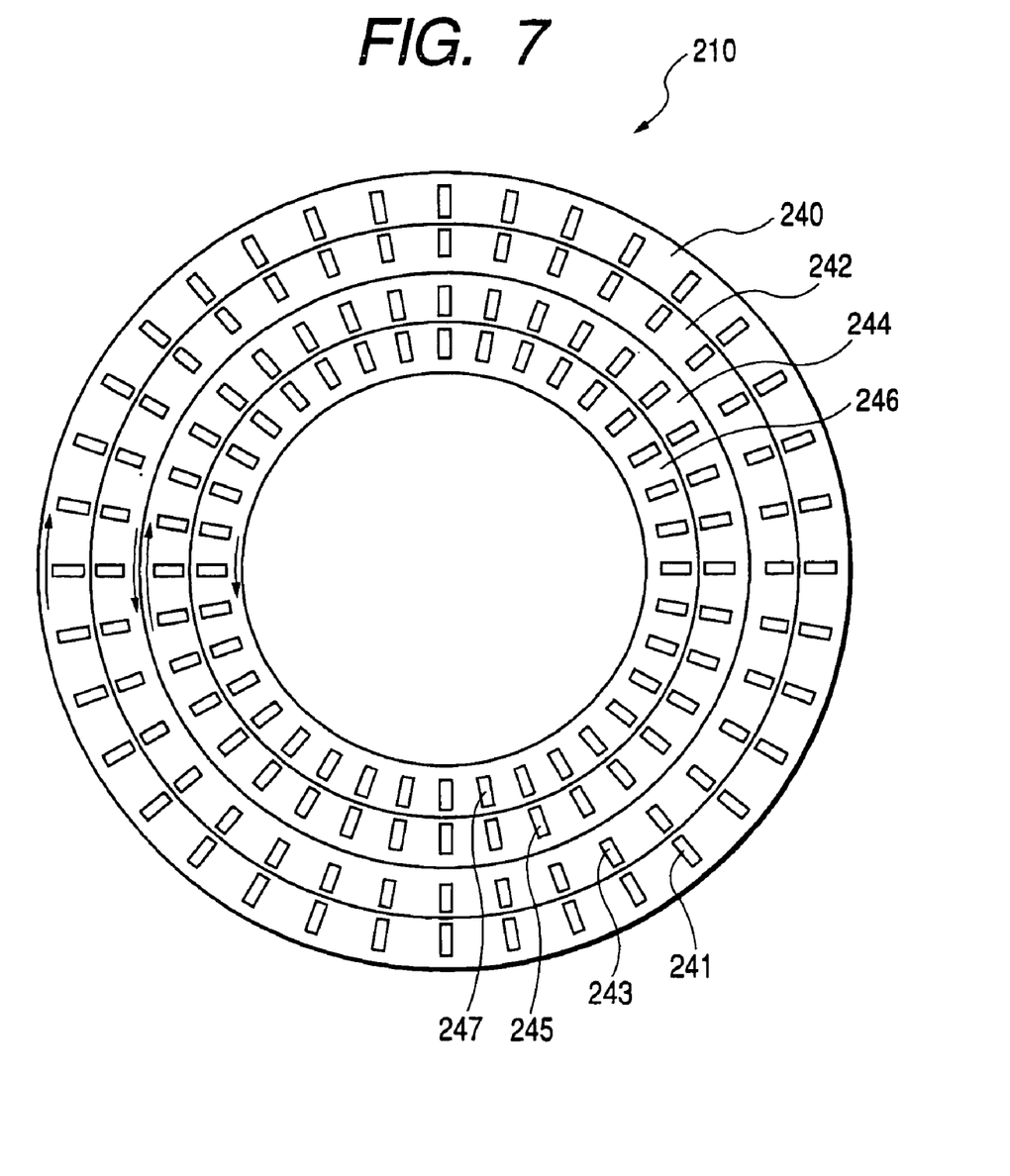
FIG. 7 is a sectional view taken substantially along line VII—VII of FIG. 6.

FIG. 7 is a sectional view taken substantially along line VII—VII of FIG. 6 and shows a transverse sectional view of the twist reshaping unit 210. The twist reshaping unit 210 comprises four cylindrical twisting jigs 240, 242, 244 and 246 concentrically arranged. Top surfaces of the twisting jigs 240, 242, 244 and 246 are placed at the same height. Each of the twisting jigs 240, 242, 244 and 246 can be independently rotated in the circumferential direction. The twisting jigs 240, 242, 244 and 246 can be moved up and down while being rotated by moving up and down the lifting shaft 212 by the lifting driving mechanism 228.

As shown in FIG. 7, insertion openings 241, 243, 245 and 247 are respectively formed on the top surfaces of the twisting jigs 240, 242, 244 and 246 to hold ends (bonding portions) of the segments 33 inserted into the insertion openings 241, 243, 245 and 247. The insertion openings 241, 243, 245 and 247 are respectively arranged along the circumferential direction of the twisting jigs 240, 242, 244 and 246. The number of insertion openings 241, the number of insertion openings 243, the number of insertion openings 245 and the number of insertion openings 247 are equal to the number of slots 35 formed in the stator core 32.

Next, an operation of the twisting apparatus 200 will be described.

The position of the stator core 32 with the segments 33 inserted into the slots 35 is set by the work receiver 202, and the periphery of the stator core 32 is fixed by the clamper 204. Thereafter, the movement of the stator core 32 and the segments 33 in the vertical direction is restrained by pressing the upper portion of the stator core 32 and the turn portions 331$c$ of the larger segments 331 by the work pressing member 206. In this fixing condition, the bending members 208 are inserted into areas, each of which is placed between the segments 33 of the slots 35 arranged along the circumferential direction of the stator core 32 and is nearly in contact with one end surface of the stator core 32, from the outside to the inside in the radial direction of the stator core 32.

Figure 8:
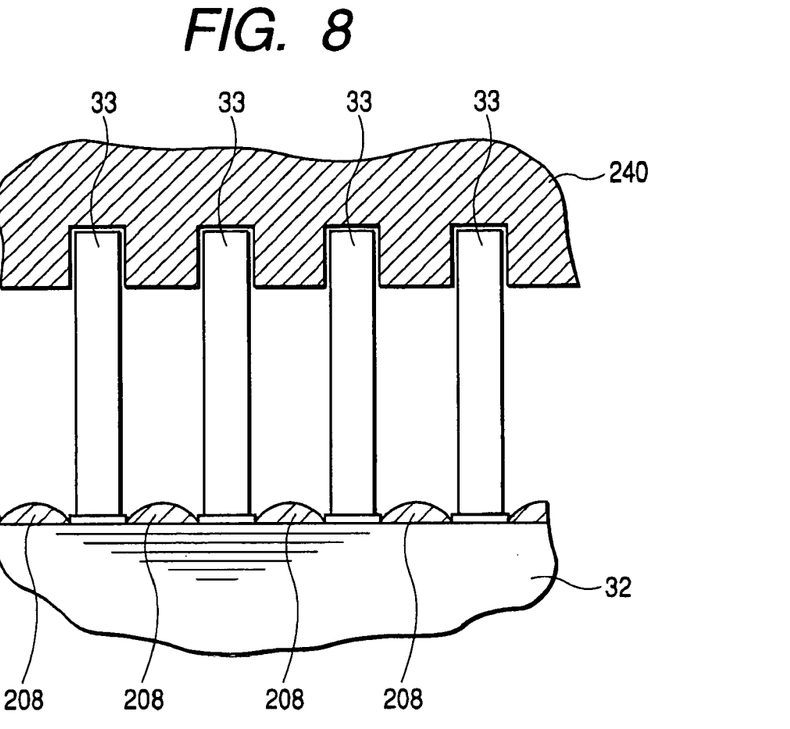
FIG. 8 is a view showing bending members each of which is inserted into an area between segments.
Figure 9:
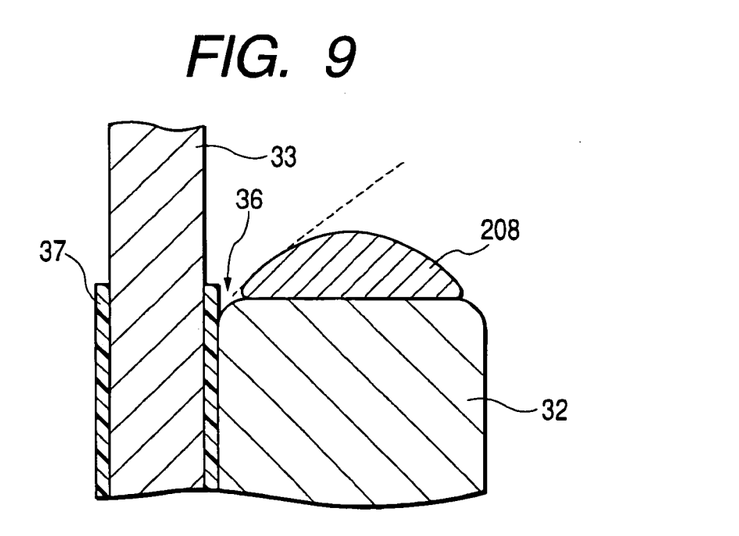
FIG. 9 is an enlarged partial sectional view of one bending member and a stator core nearly being in contact with the bending member.
Figure 10:
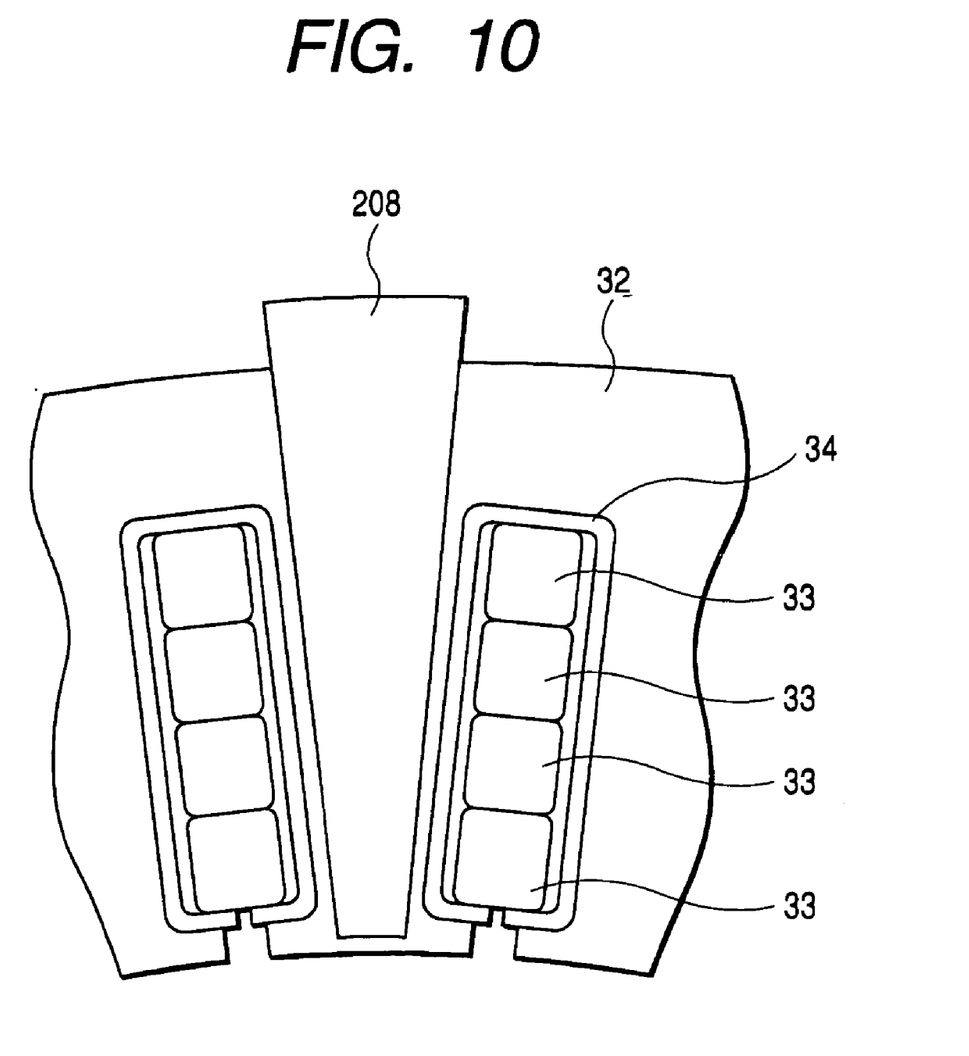
FIG. 10 is a view of one inserted bending member seen from the side of ends of segments.

FIG. 8 is a view showing the bending members 208, each of which is inserted into the area between two groups of segments 33 inserted into two slots 35 adjacent to each other, and shows a sectional view of the bending members 208 along the circumferential direction of the twisting jig 240. FIG. 9 is an enlarged partial sectional view of one bending member 208 and the stator core 32 nearly being in contact with the bending member 208. FIG. 10 is a view of one inserted bending member 208 seen from the side of the ends of the segments 33.

Each bending member 208 extending along the radial direction of the stator core 3 is inserted into an area between two groups of segments 33 inserted into two slots 35 adjacent to each other along the circumferential direction while being nearly in contact with one end surface of the stator core 32. The bending member 208 is formed of a skewer-shaped element having a copying surface (second copying surface) formed in a curved shape. When the segments 33 are twisted, portions of the segments 33 come in contact with the copying surfaces of the bending members 208. A successively-curved shape is formed out of both the copying surface of each bending member 208 and the copying surface of the slot opening forming cut 36 placed in the neighborhood of the end of the corresponding slot 35 of the stator core 32. Therefore, when the segments 33 are twisted in the bending work, the segments 33 are bent along the successively-curved shapes.

Figure 11:
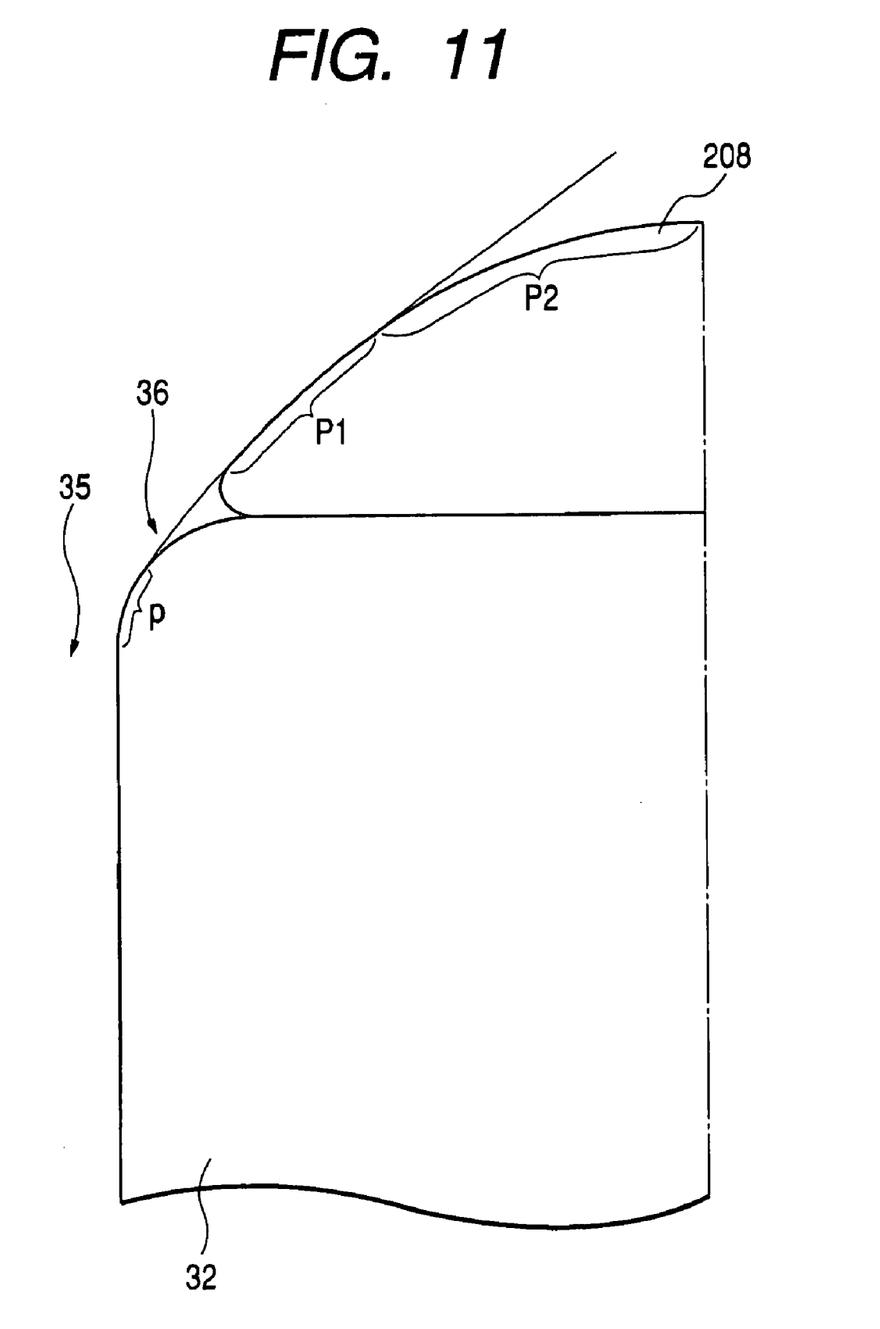
FIG. 11 is an enlarged sectional view showing a detailed shape of both one bending member and a slot opening forming cut of a stator core.

FIG. 11 is an explanatory view showing a detailed sectional shape of both one bending member 208 and one slot opening forming cut 36 of the stator core 32. Here, because a sectional surface of both each bending member 208 and a portion of the stator core 32 placed between two corresponding slots 35 is symmetrical along the circumferential direction of the stator core 32, a half sectional surface is shown in FIG. 11.

As shown in FIG. 11, the slot opening forming cut 36 having a predetermined curved surface is formed at the end of the slot 35 of the stator core 32 in its axial direction. When the twisting of the segment 33 is started in the bending work, the slot opening forming cut 36 acts as a copying surface p, and the segment 33 is bent along the slot opening forming cut 36.

Further, each bending member 208 has a curved copying surface P1, with which the segment further bent comes in contact, and a curved surface P2 formed successively to the copying surface P1. The radius of curvature of the curved surface P2 is smaller than that of the copying surface P1. Assuming that a line indicating the copying surface P1 is extended while keeping the radius of curvature of the copying surface P1, the extended line (extended copying surface P1) comes in contact with the copying surface p of the slot opening forming cut 36. Therefore, a successively-curved shape is formed out of both the copying surface p of the slot opening forming cut 36 and the copying surface P1 of the bending member 208, and the segment 33 is bent along this successively-curved shape in the bending work.

After the bending members 208 having the above-described sectional shape are inserted along the radial direction from the outside, the twist reshaping unit 210 is moved up by the lifting shaft 212 to insert the ends of the segments 33 into the insertion openings 241, 243, 245 and 247 of the twisting jigs 240, 242, 244 and 246. In this case, as shown in FIG. 8, only the bonding portions of the segments 33 to be bonded together in the following bonding work and placed at the ends of the segments 33 are inserted into the insertion openings 241, 243, 245 and 247.

Thereafter, the twist reshaping unit 210 is further moved up while being rotated by the rotational driving mechanisms 220, 222, 224 and 226 and the lifting driving mechanism 228. In this case, when the twist reshaping unit 210 is moved up while being rotated, the twisting jigs 240, 242, 244 and 246 are simultaneously moved up, the twisting jigs 240 and 244 are rotated in the clockwise direction by the same angle, and the twisting jigs 242 and 246 are rotated in the counterclockwise direction by the same angle.

Figure 12:
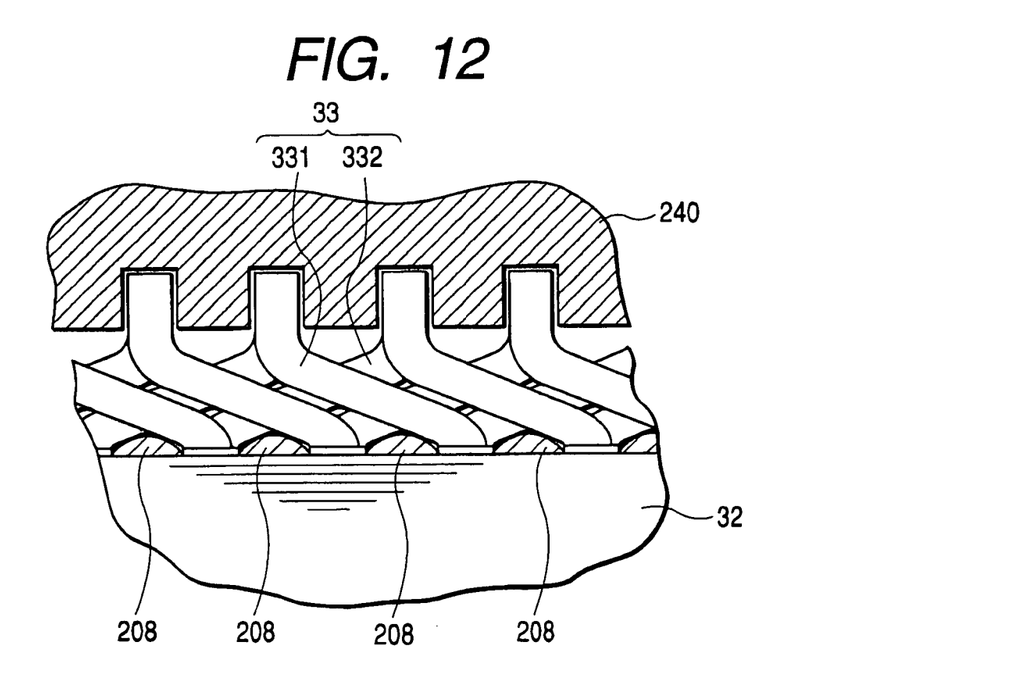
FIG. 12 is a view showing segments twisted due to the rotation of a twist reshaping unit.

FIG. 12 is a view showing the segments 33 twisted due to the rotation of the twist reshaping unit 210 and shows a sectional view of the twisted segments 33 along a circumferential direction of the twisting jig 240.

As shown in FIG. 11, the copying surface p formed in the curved shape is formed in each of the slot opening forming cuts 36 of the stator core 32, and the bending members 208 having the copying surfaces P1 formed in the curved shape are arranged on the end surface of the stator core 32. Therefore, as shown in FIG. 12, when the segments 33 are twisted by rotating the twisting jigs 240, 242, 244 and 246, the segments 33 are bent gently along the copying surfaces p and the copying surfaces P1.

Thereafter, the bending members 208 are pulled out to the outside in the radial direction, the twist reshaping unit 210 is moved down with the lifting shaft 212 by the lifting driving mechanism 228, the restraint put on the stator core 32 by the work receiver 202 and the clamper 204 is removed, and the stator 2 having the segments 33 not bonded together is taken out.

Figure 13:
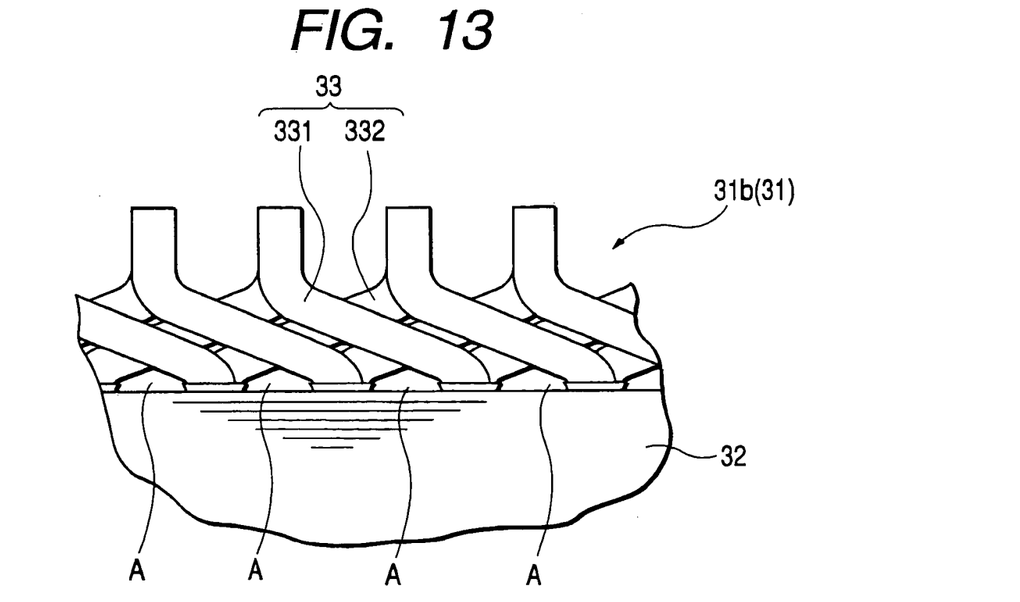
FIG. 13 is a view showing the shape of a reshaped stator winding.

Therefore, in this embodiment, the bending of the segments 33 can be started from the slot opening forming cuts 36 placed on the inside of the end surface of the stator core 32. Accordingly, as shown in FIG. 13, the group of second coil ends 31b of the segments 33 can be lowered in height. Further, a surface of a successively-curved shape is substantially formed out of both each of the copying surfaces p formed in the slot opening forming cuts 36 and each of the copying surfaces P1 formed in the bending members 208, and the segments 33 are bent along the successively-curved surfaces. Accordingly, damage to the insulating coats 37 can be prevented without applying excessive stress to the bent portions of the segments 33.

Further, when the skewer-shaped bending members 208 is in contact with the end surface of the stator core 32, the segments 33 are bent along the copying surfaces p of the slot opening forming cuts 36 and the copying surfaces P1 of the bending members 208. Accordingly, as compared with a case where portions of the segments 33 apart from the end surface of the stator core 32 toward the outside of the stator core 32 are bent, the second coil ends 31b of the segments 33 can be further lowered in height. Further, because the end surface of the stator core 32 restrains one surface of each bending member 208 from being moved, the bending member 208 can be easily positioned.

Moreover, as shown in FIG. 11, the copying surface p of each slot opening forming cut 36 is a portion of a curved surface formed on the slot opening forming cut 36, the copying surface P1 of each bending member 208 is a curved surface formed on a surface of the bending member 208, and a surface of a successively-curved shape formed out of the copying surface p and the copying surface P1 is larger than a combination of the copying surface p and the copying surface P1. Accordingly, each electric conductor can be bent along the large successively-curved shape, damage to the insulating coats 37 can be prevented, and durability of the on-vehicle alternating current generator 1 can be improved.

Furthermore, each bending member 208 is arranged so as to make an extended surface of the copying surface P1 of each bending member 208 come in contact with the copying surface p of the corresponding slot opening forming cut 36. Therefore, when the segments 33 are bent, the segments 33 can be prevented from coming in contact with corners formed in the bending members 208 or the slot opening forming cuts 36. Accordingly, no excessive stress is applied on portions of the segments 33, and damage to the insulating coats 37 can be reliably avoided.

The present invention is not limited to this embodiment, and it will be appreciated by persons skilled in the art that modifications may be made to the embodiment without departing from the scope of the invention. For example, in this embodiment, when the segments 33 are bent, the segments 33 come in contact with the copying surfaces P1 of the bending members 208. However, a flat surface may be formed on the surface of each bending member 208 to make the segments 33 come in contact with the flat surfaces.

Figure 14:
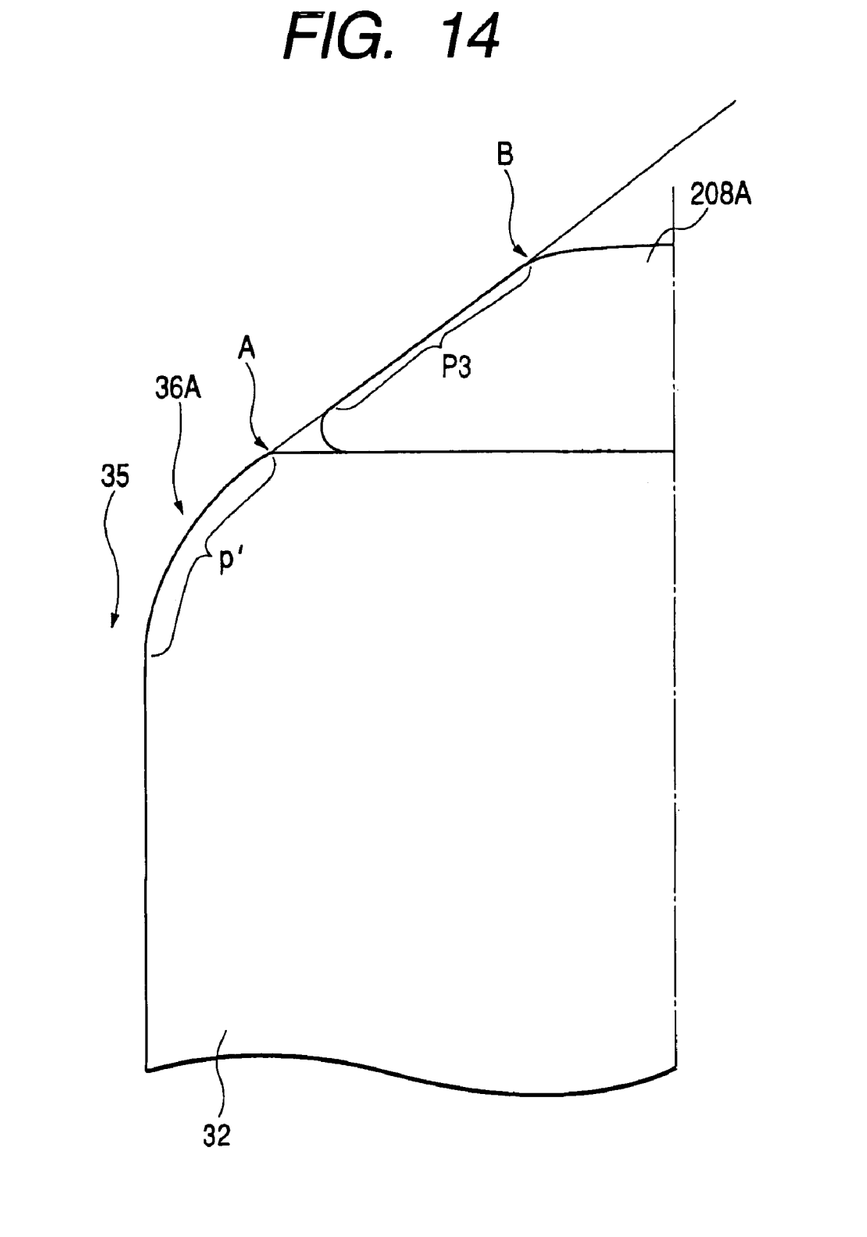
FIG. 14 is a view showing a modification in which shapes of a bending member and a slot opening forming cut of a stator core are modified.

FIG. 14 is an explanatory view showing a modification, in which shapes of each bending member and each slot opening forming cut of the stator core 32 are modified, and shows a detail shape corresponding to that of FIG. 11.

As shown in FIG. 14, a slot opening forming cut 36A having a predetermined curved surface is formed at one end of each slot 35 of the stator core 32 in its axial direction. The curved surface of the slot opening forming cut 36A has a radius of curvature larger than that of the slot opening forming cut 36 shown in FIG. 11. When the twisting of the segments 33 is started in the bending work, the entire slot opening forming cut 36A acts as a copying-surface (first copying surface) p', and the segments 33 are bent along the slot opening forming cuts 36A.

Further, each bending member 208A has a copying surface (second copying surface) P3 formed in a flat shape, and the bent segments 33 come in contact with the copying surfaces P3. An extended line (or extended surface) obtained by extending the copying surface P3 comes in contact with the copying surface p' of the slot opening forming cut 36A. Therefore, a surface of a successively-curved shape is substantially formed out of the copying surface p' formed on the entire slot opening forming cut 36A and the flat copying surface P3 formed on the bending member 208A, and the segments 33 are bent along the successively-curved surfaces in the bending work. Accordingly, damage to the insulating coats 37 can be prevented, and durability of the on-vehicle alternating current generator 1 can be improved. Further, because the copying surfaces P3 of the bending members 208A are flattened, the bending member 208A can be easily worked, and production cost of the bending members 208A can be lowered.

Moreover, as shown in FIG. 14, because the curved copying surface p' having a larger radius of curvature is used by setting the entire slot opening forming cut 36A as the copying surface p', the copying surface p' can be easily formed. Particularly, when the stator core 32 is formed by laying a plurality of iron plates one on top of another, the iron plates are thinned according to a radius of curvature of copying surfaces of entire slot opening forming cuts, and the curved copying surfaces of the entire slot opening forming cuts are formed by pressing the stator core 32. In this case, when the stator core 32 is pressed so as to lower the radius of curvature of the copying surfaces of the entire slot opening forming cuts, as well known, undesirable burrs are easily generated at ends of the iron plates in the neighborhood of the end surface of the stator core 32. In a case where these burrs remain in the stator core 32, when the segments 33 are bent, the burrs break through the insulators 34, and insulation between a group of segments 33 and the stator core 32 deteriorates. However, as shown in FIG. 14, because the radius of curvature of the copying surfaces p' of the entire slot opening forming cuts 36A is set to be large, the generation of burrs can be suppressed, and the segments 33 can be excellently insulated from the stator core 32.

Furthermore, the bending angle of the segments 33 in the bending work is sometimes set to a value larger than a desired inclined angle of the segments 33 by considering spring back of the segments 33. In this modification, no segment 33 is bent at a corner (a position A in FIG. 14) formed on the end surface of the stator core 32, but each segment 33 can be bent at a corner (a position B in FIG. 14) of the bending member 208A. In detail, the segment 33 is first bent along the copying surface p' of the slot opening forming cut 36A, and then comes in contact with the copying surface P3 of the bending member 208A. Thereafter, the segment 33 is bent along a copying surface (a surface placed on the upper side of the position B in FIG. 14, third copying surface) formed at a position which is further apart from the end surface of the stator core 32 than that of the copying surface P3, the segment 33 returns due to a spring back movement to a position at which the segment 33 is bent along the copying surface P3 at the desired inclined angle, and the ends of the segment 33 are bonded to those of the other. Accordingly, damage to the insulating coats 37 of the segments 33 in the neighborhood of corners of the end surface of the stator core 32 can be avoided, and the deterioration of insulation between the group of segments 33 and the stator core 32 can be prevented.

What is claimed is:

1. A method of producing a wiring of a dynamo-electric machine, in which a plurality of electric conductors respectively having insulating coats on surfaces thereof are received in each of a plurality of slots formed in a stator core in a line along a circumferential direction of the stator core so as to form a plurality of coil ends of the electric conductors when portions of the electric conductors protruded from an end surface of the stator core are bent in the circumferential direction of the stator core, the method comprising the steps of:

forming a first copying surface in a slot opening forming cut at an end of each slot on the end surface of the stator core so as to be curved along a bending direction of the corresponding electric conductors;

forming a second copying surface on each of a plurality of bending members;

inserting each bending member into an area between two corresponding slots adjacent to each other in the circumferential direction on the end surface of the stator core such that the second copying surface of the bending member is curved along a bending direction of the electric conductors of the slots and such that a successively-curved shape is formed out of both the first copying surface placed at each of the ends of the two slots and the second copying surface;

bending each of the electric conductors along the corresponding first copying surface; and further bending each of the electric conductors along the corresponding second copying surface such that the electric conductor is bent in the successively-curved shape.

2. The method according to claim 1, wherein each electric conductor is bent along the corresponding first copying surface and the corresponding second copying surface in the step of bending each of the electric conductors in a condition that the corresponding bending member is in contact with the end surface of the stator core.

3. The method according to claim 1, wherein each first copying surface is a portion of a curved surface formed on the corresponding slot opening forming cut, each second copying surface is a curved surface formed on a surface of the corresponding bending member, and a curved surface of the successively-curved shape is larger than a combination of the corresponding first copying surface and the corresponding second copying surface.

4. The method according to claim 1, further comprising the step of bonding the coil ends of the electric conductors together so as to produce a winding from the electric conductors.

5. The method according to claim 1, wherein each electric conductor received in each slot is connected in advance to the other electric conductor received in the other slot on a side of another end surface of the stator core so as to produce a winding from the electric conductors.

6. The method according to claim 1, wherein each bending member is formed in a skewer shape.

7. The method according to claim 1, further comprising the step of:

forming a curved surface disposed successively to the second copying surface on each bending member such that a radius of curvature of the curved surface is smaller than that of the second copying surface.

8. A method of producing a wiring of a dynamo-electric machine, in which a plurality of electric conductors respectively having insulating coats on surfaces thereof are received in each of a plurality of slots formed in a stator core in a line along a circumferential direction of the stator core so as to form a plurality of coil ends of the electric conductors when portions of the electric conductors protruded from an end surface of the stator core are bent in the circumferential direction of the stator core and to position and bond tops of the electric conductors together, the method comprising the steps of:

forming a first copying surface in a slot opening forming cut at an end of each slot on the end surface of the stator core so as to be curved along a bending direction of the corresponding electric conductors and so as to intersect with the end surface of the stator core;

forming a second copying surface and a third copying surface on each of a plurality of bending members;

inserting each bending member into an area between two corresponding slots adjacent to each other in the circumferential direction so as to make an extended surface of the second copying surface come in contact with an intersection point of the corresponding first copying surface and the end surface of the stator core and so as to place the third copying surface further away from the end surface of the stator core than the second copying surface, a successively-curved shape being formed out of the second copying surface and the corresponding copying surface;

bending the electric conductors along the first copying surfaces;

making the electric conductors come in contact with the second copying surfaces;

bending the electric conductors along the third copying surfaces;

returning the electric conductors to positions, at which the electric conductors extend along the second copying surfaces, due to spring back of the electric conductors; and bonding the electric conductors together so as to produce a winding from the electric conductors.

* * * * *